United States Patent
Nelson et al.

(10) Patent No.: US 7,801,779 B2
(45) Date of Patent: Sep. 21, 2010

(54) CASH UNDER AND CASH OVER ADJUSTMENTS TO RECEIPT TOTALS FOR BANK DEPOSITS

(75) Inventors: Kimberly Ann Nelson, Fargo, ND (US); Michael W. Moberg, West Fargo, ND (US); Nancy Lee Egeberg, Argusville, ND (US); Scott Wesley McIntyre, Moorhead, MN (US)

(73) Assignee: Microsoft Corporation, Redmond, WA (US)

( * ) Notice: Subject to any disclaimer, the term of this patent is extended or adjusted under 35 U.S.C. 154(b) by 1201 days.

(21) Appl. No.: 11/066,334

(22) Filed: Feb. 24, 2005

(65) Prior Publication Data

US 2006/0186193 A1 Aug. 24, 2006

(51) Int. Cl.
*G07F 17/22* (2006.01)
(52) U.S. Cl. ................. 705/30; 705/16; 705/21
(58) Field of Classification Search .............. 705/30, 705/16, 21
See application file for complete search history.

(56) References Cited

U.S. PATENT DOCUMENTS

| | | | | |
|---|---|---|---|---|
| 5,117,356 A * | 5/1992 | Marks | .......... | 705/30 |
| 5,390,113 A * | 2/1995 | Sampson | .......... | 705/30 |
| 5,875,435 A * | 2/1999 | Brown | .......... | 705/30 |
| 6,230,145 B1 * | 5/2001 | Verderamo et al. | .......... | 705/35 |
| 6,246,999 B1 * | 6/2001 | Riley et al. | .......... | 705/30 |
| 6,584,453 B1 * | 6/2003 | Kaplan et al. | .......... | 705/39 |
| 6,882,986 B1 * | 4/2005 | Heinemann et al. | .......... | 705/40 |
| 7,114,649 B2 * | 10/2006 | Nelson et al. | .......... | 235/379 |
| 7,120,597 B1 * | 10/2006 | Knudtzon et al. | .......... | 705/30 |
| 7,131,579 B2 * | 11/2006 | Kim | .......... | 235/379 |
| 7,263,527 B1 * | 8/2007 | Malcolm | .......... | 707/102 |
| 2002/0052791 A1 * | 5/2002 | Defede et al. | .......... | 705/16 |
| 2002/0128964 A1 * | 9/2002 | Baker et al. | .......... | 705/39 |
| 2003/0046194 A1 * | 3/2003 | McClendon et al. | .......... | 705/30 |

* cited by examiner

*Primary Examiner*—Ramsey Refai
(74) *Attorney, Agent, or Firm*—Joseph R. Kelly; Westman, Champlin & Kelly, P.A.

(57) ABSTRACT

A method of correcting a computerized ledger for deposit discrepancies uses a display such as a window to record a deposit transaction. An amount of receipts and an amount of adjustment are provided to account for cash over and cash under adjustments to a bank deposit. The data is stored in a computerized ledger system. A real time output is provided from the computerized ledger system that represents the amount of receipts adjusted by the amount of adjustment. Real time, such as same day, accounting data relating to deposits is available for reporting and decision-making.

18 Claims, 9 Drawing Sheets

BANK DEPOSIT/ADJUSTMENT TRANSACTIONS [?] [X]

- ● English  ○ Espanol     238 TRANSACTION NUMBER
- 202        204   206           03120400015
- December 3, 2004  4:50PM  208

STORE [Store # 11 Fargo ▼] — 210

REPORT MADE BY [J. CHECKOUT ▼] — 214
                              212

CURRENCY [US Dollars ▼] — 218
              216

AMOUNT OF RECEIPTS [11,000.00] — 230

---

REPORT ADJUSTMENT — 222

242 — ● CASH OVER
244 — ● CASH UNDER

NET AMOUNT OF ADJUSTMENT   [1,000.00] — 240
NET AMOUNT OF DEPOSIT      [10,000.00] — 250

Comments (itemize & explain any adjustment)

[$400 PARTY; $600 LOST]

— 248

---

BANK [XYZ Bank ▼] — 228

DEPOSIT MADE BY [A. CLERK ▼]     [PAGE SETUP] — 236
                 232

● PRINT DEPOSIT SLIP AT PRINTER [HP9 MGR OFFICE ▼] — 234

[CANCEL]                              252 — [OK]

FIG. 2

RECONCILIATION DATA TABLE FOR ACCOUNT OF:
STORE #11 AT XYZ BANK FOR THE PERIOD OF NOV 30 TO DEC 31, 2004 — 600

| DATE/TIME CODE | DATE /TIME GROUP | DATA ENTRY TYPE | DEPOSIT AMOUNT | RECEIPTS AMOUNT | ADJUSTMENT AMOUNT | RECON-CILED YES/NO | ADJUSTMENT REMARKS |
|---|---|---|---|---|---|---|---|
| 03DEC1710 | 0 | DEP | 10,000.00 | | | NO | |
| 07DEC1730 | 0 | DEP | 7,500.00 | | | NO | |
| 12DEC1810 | 0 | DEP | 6250.00 | | | NO | |
| 22DEC1650 | 0 | DEP | 8,900.00 | | | NO | |
| 30DEC1715 | 0 | DEP | 10,000.00 | | | NO | |
| 03DEC1650 | 0 | LDGR | | 11,000.00 | (1000.00) | NO | $400 PARTY; $600 LOST |
| 07DEC1702 | 0 | LDGR | | 7,575.00 | (75.00) | NO | $75 ACE WINDOW CLEANERS |
| 12DEC1719 | 0 | LDGR | | 6,250.00 | | NO | |
| 22DEC1546 | 0 | LDGR | | 9,000.00 | (277.12) | NO | TILL SHORTAGE |
| 30DEC1655 | 0 | LDGR | | 10,257.12 | | NO | |
| 31DEC2350 | 0 | LDGR | | | 257.12 | NO | FOUND $257 IN OFFICE |

FIG. 6

RECONCILIATION DATA TABLE FOR ACCOUNT OF:
STORE #11 AT XYZ BANK FOR THE PERIOD OF NOV 30 TO DEC 31, 2004 — 700

| DATE/TIME CODE | DATE/TIME GROUP | DATA ENTRY TYPE | DEPOSIT AMOUNT | RECEIPTS AMOUNT | ADJUSTMENT AMOUNT | RECON-CILED YES/NO | ADJUSTMENT REMARKS |
|---|---|---|---|---|---|---|---|
| 03DEC1650 | 0 | LDGR | | 11,000.00 | (1000.00) | NO | $400 PARTY; $600 LOST |
| 03DEC1710 | 0 | DEP | 10,000.00 | | | NO | |
| 07DEC1702 | 0 | LDGR | | 7,575.00 | (75.00) | NO | $75 ACE WINDOW CLEANERS |
| 07DEC1730 | 0 | DEP | 7,500.00 | | | NO | |
| 12DEC1719 | 0 | LDGR | | 6,250.00 | | NO | |
| 12DEC1810 | 0 | DEP | 6250.00 | | | NO | |
| 22DEC1546 | 0 | LDGR | | 9,000.00 | | NO | |
| 22DEC1650 | 0 | DEP | 8,900.00 | | | NO | |
| 30DEC1655 | 0 | LDGR | | 10,257.12 | (277.12) | NO | TILL SHORTAGE |
| 30DEC1715 | 0 | DEP | 10,000.00 | | | NO | |
| 31DEC2350 | 0 | LDGR | | | 257.12 | NO | FOUND $257 IN OFFICE |

FIG. 7

RECONCILIATION DATA TABLE FOR ACCOUNT OF:
STORE #11 AT XYZ BANK FOR THE PERIOD OF NOV 30 TO DEC 31, 2004 — 800

| DATE/TIME CODE | DATE /TIME GROUP | DATA ENTRY TYPE | DEPOSIT AMOUNT | RECEIPTS AMOUNT | ADJUSTMENT AMOUNT | RECON-CILED YES/NO | ADJUSTMENT REMARKS |
|---|---|---|---|---|---|---|---|
| 03DEC1650 | 1 | LDGR | | 11,000.00 | (1000.00) | NO | $400 PARTY; $600 LOST |
| 03DEC1710 | 1 | DEP | 10,000.00 | | | NO | |
| 07DEC1702 | 2 | LDGR | | 7,575.00 | (75.00) | NO | $75 ACE WINDOW CLEANERS |
| 07DEC1730 | 2 | DEP | 7,500.00 | | | NO | |
| 12DEC1719 | 3 | LDGR | | 6,250.00 | | NO | |
| 12DEC1810 | 3 | DEP | 6250.00 | | | NO | |
| 22DEC1546 | 4 | LDGR | | 9,000.00 | | NO | |
| 22DEC1650 | 4 | DEP | 8,900.00 | | | NO | |
| 30DEC1655 | 5 | LDGR | | 10,257.12 | (277.12) | NO | TILL SHORTAGE |
| 30DEC1715 | 5 | DEP | 10,000.00 | | | NO | |
| 31DEC2350 | 0 | LDGR | | | 257.12 | NO | FOUND $257 IN OFFICE |

FIG. 8

RECONCILIATION DATA TABLE FOR ACCOUNT OF:
STORE #11 AT XYZ BANK FOR THE PERIOD OF NOV 30 TO DEC 31, 2004 — 900

| DATE/TIME CODE | DATE/TIME GROUP | DATA ENTRY TYPE | DEPOSIT AMOUNT | RECEIPTS AMOUNT | ADJUSTMENT AMOUNT | RECON-CILED YES/NO | ADJUSTMENT REMARKS |
|---|---|---|---|---|---|---|---|
| 03DEC1650 | 1 | LDGR |  | 11,000.00 | (1000.00) | YES | $400 PARTY; $600 LOST |
| 03DEC1710 | 1 | DEP | 10,000.00 |  |  | YES |  |
| 07DEC1702 | 2 | LDGR |  | 7,575.00 | (75.00) | YES | $75 ACE WINDOW CLEANERS |
| 07DEC1730 | 2 | DEP | 7,500.00 |  |  | YES |  |
| 12DEC1719 | 3 | LDGR |  | 6,250.00 |  | YES |  |
| 12DEC1810 | 3 | DEP | 6250.00 |  |  | YES |  |
| 22DEC1546 | 4 | LDGR |  | 9,000.00 |  | NO |  |
| 22DEC1650 | 4 | DEP | 8,900.00 |  |  | NO |  |
| 30DEC1655 | 5 | LDGR |  | 10,257.12 | (277.12) | NO | TILL SHORTAGE |
| 30DEC1715 | 5 | DEP | 10,000.00 |  |  | NO |  |
| 31DEC2350 | 0 | LDGR |  |  | 257.12 | NO | FOUND $257 IN OFFICE |

FIG. 9

CASH UNDER AND CASH OVER ADJUSTMENTS TO RECEIPT TOTALS FOR BANK DEPOSITS

BACKGROUND OF THE INVENTION

The present invention relates to resolving discrepancies between recorded receipts and bank deposits in an accounting system for a business enterprise. In particular, the present invention relates to real time correction for such discrepancies in general ledger amounts, and to reconciliation of bank statements with such discrepancies. Generally, the person reconciling the bank statement is not the same person who created the bank deposits. The person doing the reconciliation may not understand any discrepancies between what the bank says was deposited and what an ERP system says was deposited.

As a retailer completes sales transactions and receives payments from customers, the sales amounts are typically recorded using cash registers or point-of-sale terminals. The payments received (receipts) accumulate in cash register tills (or cash safes) at the retailer's premises. The accumulated receipts are taken periodically to a bank and deposited in a bank deposit account. There is generally also a small, relatively constant, amount of cash that is retained at the retailer's premises for making change for customers, and that is never deposited.

The cash registers compute the total sales amounts as well as any payments received. These are entered into an accounting system and increase general ledger balances. The general ledger balances, in turn, are relied on as representative of an amount of "cash on hand" in the bank deposit account. Decisions, such as a decision to transfer funds out of the bank deposit account, are made in real time based on the information in the general ledger account.

It sometimes happens that the actual amount of deposit to the bank has a significant variation from the total receipts computed by the cash registers. Variations can be due to theft, mysterious disappearance, errors in making change, cash taken out of a till to pay for deliveries at the retailer's premises, expenses for emergency repairs, or the cost of entertaining customers or others. Funds which are misplaced on one day may be found on a subsequent day, resulting in a variation in deposits for both days. At the end of the day, the bank deposit will sometimes be different than the computed total receipts.

Errors in the general ledger due to these discrepancies can persist for a month or more and may only be corrected when a monthly bank statement is received and reconciled with the general ledger. In the meantime, variations can accumulate to large amounts, leading to real time errors in decisions to transfer funds out of the deposit account or decisions to report income for the enterprise. The problem is compounded in large enterprises where there are multiple cash registers in each retail location, multiple retail locations, and multiple banks where deposits are made.

In the prior art, such general ledger errors have been dealt with inadequately by leaving larger balances than needed in deposit accounts, manually calculating estimated adjustments from the general ledger amounts and telephone calls between an accounting department and a retailer's premises or the bank to attempt to estimate or correct for general ledger errors.

A method and apparatus are needed to automatically reduce real time errors in general ledger accounts due to discrepancies in amounts deposited in bank accounts relative to recorded receipts.

SUMMARY OF THE INVENTION

A method of correcting a computerized ledger for deposit discrepancies. The method comprises displaying a transaction screen display, such as a window, associated with a deposit transaction.

A number of receipts associated with the deposit transaction is received at the transaction screen display, typically from a retail store computing system that includes point of sale terminals.

Data representing an amount of adjustment between the amount of receipts and an amount deposited in the deposit transaction is also entered by an operator. The entry may be either direct entry of the adjustment (cash over or cash under amount) or, alternatively, entry of a deposit amount from which the adjustment can be calculated.

The data representing the amount of receipts and the data representing an amount deposited is stored in a computerized ledger system. A real time output is provided from the computerized ledger system that represents the amount of receipts adjusted by the amount of adjustment. Real time, such as same day, accounting data relating to deposits is available for reporting and decision-making.

BRIEF DESCRIPTION OF THE DRAWINGS

FIG. 2 illustrates one display screen that is useful in entering data that can be used to report receipts and a deposit adjustment to a ledger system.

FIG. 6 illustrates an example of a reconciliation data table after initial copying of data into the data table.

FIG. 7 illustrates an example of a reconciliation data table after sorting by date/time code.

FIG. 8 illustrates an example of a reconciliation data table after calculation of date/time groups.

FIG. 9 illustrates an example of a reconciliation data table after automatic reconciliation.

DETAILED DESCRIPTION OF ILLUSTRATIVE EMBODIMENTS

Figure 1:
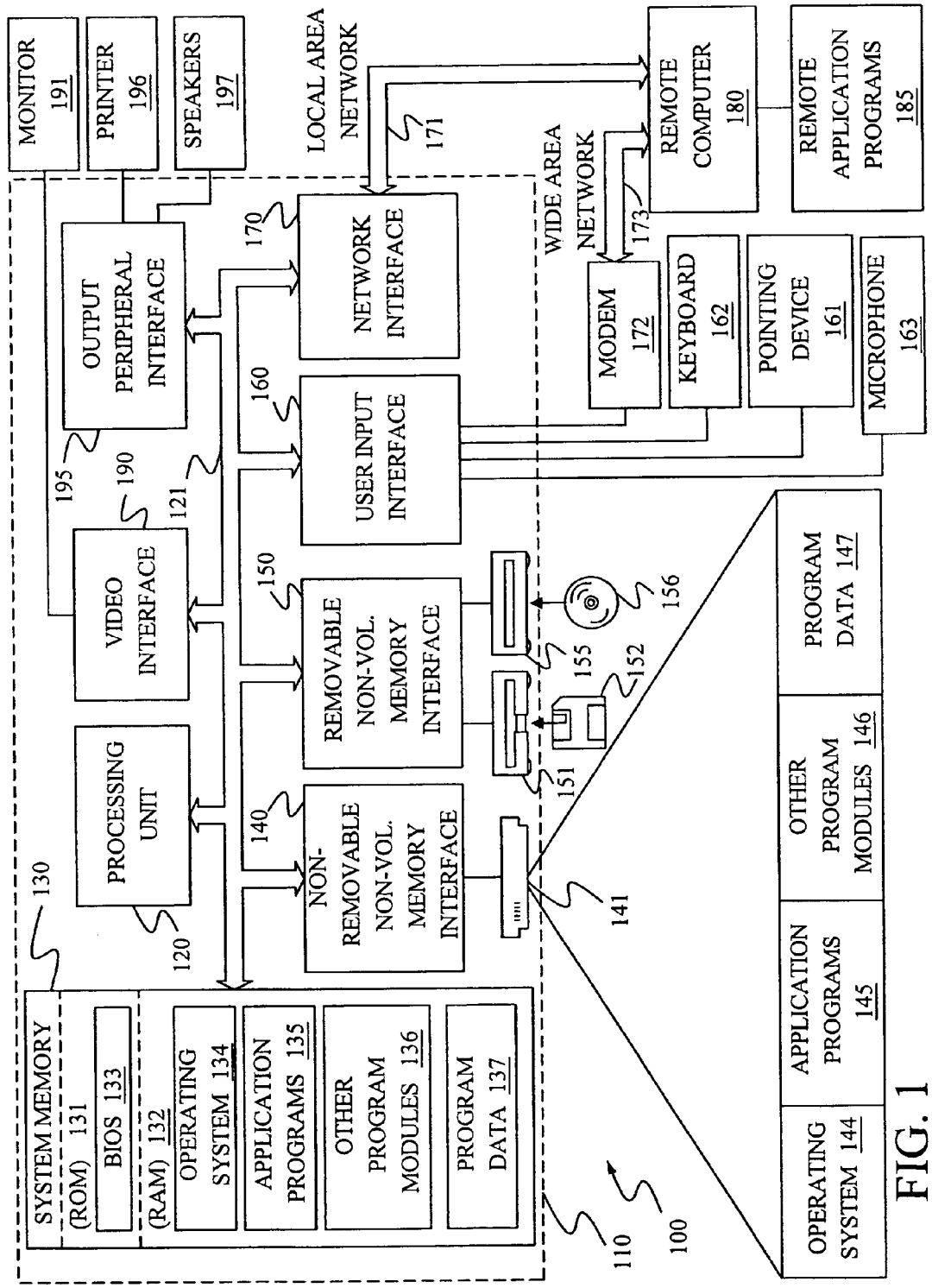
FIG. 1 is a block diagram of one computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

In the embodiments described below, an increase or decrease adjustment associated with a bank deposit can be entered automatically into a grouping of cash transactions in a computerized ERP system. The decrease adjustment avoids the problem of excessively high cash flow data in the ledger system which can lead to incorrect decisions concerning cash flow. An increase adjustment can be entered in the situations where there is an overage in a cash drawer.

In Enterprise Resource Planning (ERP) systems, sales receipts reports comprise a group of cash-in transactions where the group is totaled and is reconciled to a corresponding deposits appearing on a bank statement. One problem with ERP systems is that sometimes the total actual cash being deposited is less than the total amount of the receipt transactions in the group. One reason for this is that the business may have had one of their employees run down to the corner store for something needed in their business and have given the employee money from a cash drawer to pay for the item.

When reporting the sales and payments received, the user has the ability to add a cash-over or a cash-under adjustment report to the receipts recorded on cash registers. The adjustment is a difference between reported receipts and the amount being deposited at the bank. The user has an option of entering an adjustment amount on an adjustment line which can used to default specific general ledger accounts for the adjustment amount.

For example, cash-in (receipts) transactions recorded into the system may total to $2,356.10 on a particular day. This is the amount that has been recorded into the system by individual cash receipts (cash-in transactions). When the cash drawer is counted at the end of the day, there is a shortage of $0.72. The user needs to be able to create a deposit slip with all the cash receipt transactions for the amount of $2355.38. Since the bank deposit transaction would automatically total up the cash receipts, the deposit amount would not match what is taken to the bank. By providing the ability to enter a decrease adjustment to the receipts report, the amount of adjusted receipts now matches the amount taken to the bank for deposit. The user then only needs to enter the amount the cash drawer was short and the system would post this amount to the correct general ledger accounts. This solves a major problem with deposits on the bank statement not matching the combined receipts that are included in a deposit in the ERP system. This also solves the problem of the person doing the bank reconciliation not being able to match the deposit amounts in the ERP system versus the bank statement and having to research the discrepancies.

FIG. 2 illustrates a transaction screen display 200 that is useful in entering data that can be used to report receipts associated with a bank deposit and a deposit adjustment ("cash under" or "cash over") associated with the bank deposit. The transaction display screen 200 illustrated in FIG. 2 is merely exemplary, and it will be understood by those skilled in the art that various known types of data entry interfaces can be used, and that the appearance of the display can vary depending on the operating system used and the mix of computer hardware and software that is available in a particular computing environment. In a preferred arrangement, the transaction screen display 200 comprises a window as illustrated, however, other display screen can be used as well.

The transaction screen display 200 shown in FIG. 2 is displayed, when needed, on a screen of a cash register or other computer equipment at a retailer's store premises in preparation for making a bank deposit. The transaction screen display 200 comprises a data entry form that both displays data from the computing environment at the retail store premises, but that also can be filled in with deposit data by retail store personnel using, for example, a keyboard and/or a pointing device, such as a mouse. Other known methods of data entry can be used as well.

The transaction screen display 200 includes optional radio buttons 202, 204. One of the radio buttons 202, 204 is selected with the pointing device to select a language for textual dialog on transaction screen display 200. In the example illustrated, radio button 202 has been selected with a mouse to provide English language dialog. Other known selection interfaces can be used to select a language, such as check boxes or spinners (not illustrated). The number of languages can be selected as needed to ensure convenient access by personnel in a particular locality. The selection of language may also be used to localize formatting and presentation of the transaction display screen 200 in accordance with regional customs.

A unique transaction number 238, preferably including a serial number, is automatically assigned for uniquely distinguishing this transaction from other earlier and later transactions. In a preferred arrangement, if the operator enters an earlier transaction number at 238 (that is different than the automatically assigned transaction number), then the computer will search for this earlier transaction and display the earlier transaction data, but does not allow earlier transaction data to be changed or reentered.

At 206, the transaction screen display 200 displays a current date and time from the computer operating environment. The display of date and time at 206 enables an operator to verify that the calendar and clock are set properly so that data from the transaction being entered on the form can be conveniently associated with a date, and in some cases also a time of the corresponding bank deposit during a reconciliation process described in more detail below. In the example illustrated, the current date is Dec. 3, 2004 and the current time is 4:50 PM.

The transaction screen display 200 displays the identity of a particular retail store premises at 208 from which this transaction report originates. The identity of the retail store premises can be fixed at installation, or can be selectable from a drop down menu by pointing at arrow 210 with a pointing device. In the example illustrated, the particular retail store premise is identified as "Store #11 Fargo." Other known interactive screen displays can also be used to enter the identity of the retail store.

At 212, the transaction screen display 200 includes an identity of a store employee who is preparing the report. The identity of the store employee can be selected from a drop down menu by pointing at arrow 214 with a pointing device. In the example illustrated, the store employee "J. Checkout" is identified. Other known interactive screen displays can also be used to enter the identity of the retail store employee.

At 216, the transaction screen display 200 includes an identity of the monetary unit or currency that is to be used is preparing the report. The identity of the monetary unit will typically be fixed at the time of installation, but can alternatively be selected from a drop down menu by pointing at arrow 218 with a pointing device. In the example illustrated, the currency identified is "US Dollars." Other known interactive screen displays can also be used to enter the unit of currency.

The transaction screen display 200 includes a display 230 of an amount of receipts recorded since a time of entry of a most recent (last) transaction report using display screen 200. In most cases, the amount of receipts is automatically obtained from the computing environment in the retail store and cannot be altered by the person making the report.

An adjustment report display region 222 includes radio buttons 242, 244 that are used to select either a "cash over" or "cash under" adjustment. Also in display region 222, a display 240 is provided to permit entry of an amount of an adjustment. Once one of the radio buttons 242, 244 is selected and an amount of adjustment is entered in display 240, then an amount of deposit is automatically calculated and displayed in display 250. If the operator alternatively enters a net amount of deposit in display 250, then a net amount of adjustment is automatically calculated and displayed in display 240. A text field 248 is provided for entering an explanation of the reason for the adjustment. If the amount of the adjustment is non-zero, the transaction will not be entered until some text is entered into text field 248.

A display 228 identifies a particular bank where a deposit will be made. A display 232 indicates the name of the person making the deposit, which can be changed. A display 234 indicates the identity of a printer where a deposit slip will be printed, and a page setup button 236 can be selected with a pointing device to access screens for setting up a printer to print a deposit slip. In some cases, deposit slips will be blank forms, provided by a bank, that are filled in by hand, and printing a deposit slip is not required.

An operator (typically a store clerk or store manager) enters information associated with the deposit transaction into the various displays 208, 212, 242 or 244, 240 or 250, 248, 228, 232, 234 for a particular deposit. After checking the accuracy of the information entered in transaction screen display 200, the operator points at OK button 252 with a pointing device to make a deposit receipts report, optionally print a deposit slip and optionally make an adjustment report. After the OK button 252 is selected with a mouse or other pointing device, the data entered into the transaction screen display 200 is stored in memory, typically in multiple locations, as described in more detail below in connection with FIG. 3. After the OK button 252 is selected, the "amount of receipts" registered in the computing environment of the store indicated in display 208 is reset to zero in preparation for the next subsequent deposit. Money resulting from the receipts is taken to the bank for deposit.

Figure 3:
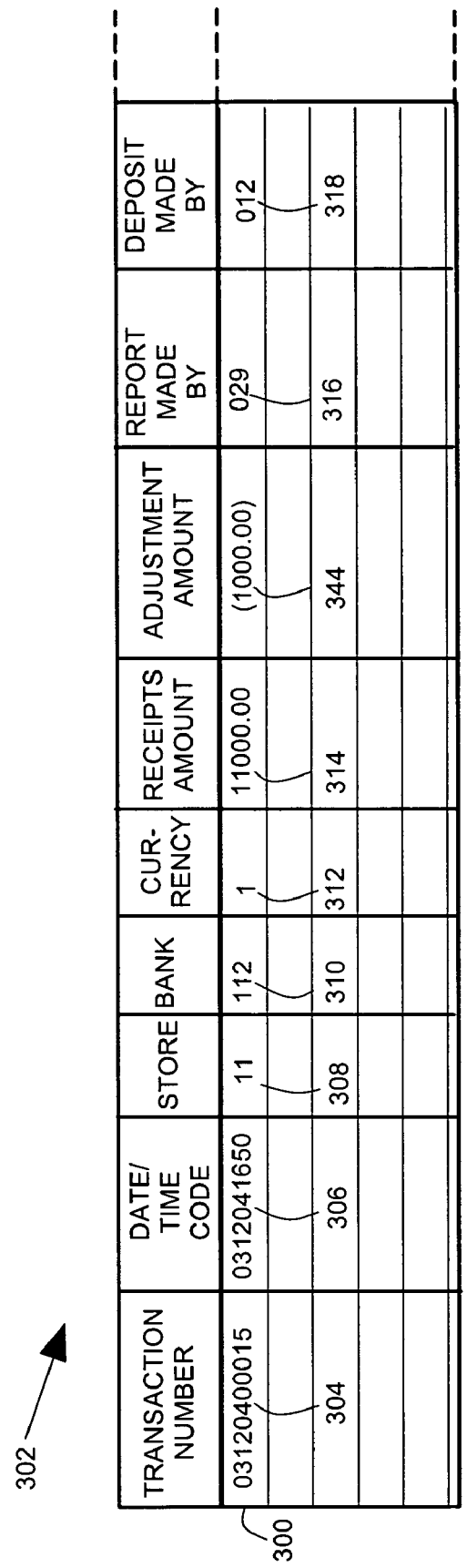
FIG. 3 illustrates data stored as a result of a data entry shown in FIG. 2.

FIG. 3 illustrates a line of data 300 stored as a result of a report made using the transaction screen display 200 in FIG. 2. The line of data 300 is stored in a data table 302 which will typically also include a large number of other lines of data from previous transactions. The fields in each line of data shown in FIG. 3 are exemplary. At a minimum, data is needed that can provide, either directly or by calculation, an amount of receipts, an amount of adjustment, and some data distinguishing one transaction from another transaction. The amount of identifying data needed will depend on the complexity of the retailer's operation.

The line of data 300 includes a transaction number 304 (taken from 238 in FIG. 2), a date/time code 306 (computed from 206 in FIG. 2), a store number 308 (computed from 208 in FIG. 2), a bank number 310 (computed from 228 in FIG. 2), a currency number 312 (computed from 216 in FIG. 2), a receipts amount 314 (taken from 230 in FIG. 2), an adjustment amount 344 (taken from 240, 242, 244 in FIG. 2), a "report made by" number 316 (computed from 212 in FIG. 2), and a "deposit made by" number 318 (computed from 232 in FIG. 2). Parentheses around the dollar amount 344 indicate that the dollar amount is a "cash under" (from radio button 244 in FIG. 2). Computations of numbers 308, 310, 312, 316, 318 are typically made from a lookup table to provide numbers in the data table 302 that are in convenient formats for sorting and calculations. The lookup table relates verbose screen displays, typically in multiple languages, to more compact codes that can be conveniently sorted and manipulated by software. As indicated by broken lines, the deposit data table 302 can include additional data fields in a data line 300, depending on the needs of the application.

As explained in more detail below in connection with FIG. 4, data in FIG. 3 is stored at the retail store and also transmitted to, and stored in, a general ledger system that is typically in an accounting department at a remote location.

Figure 4:
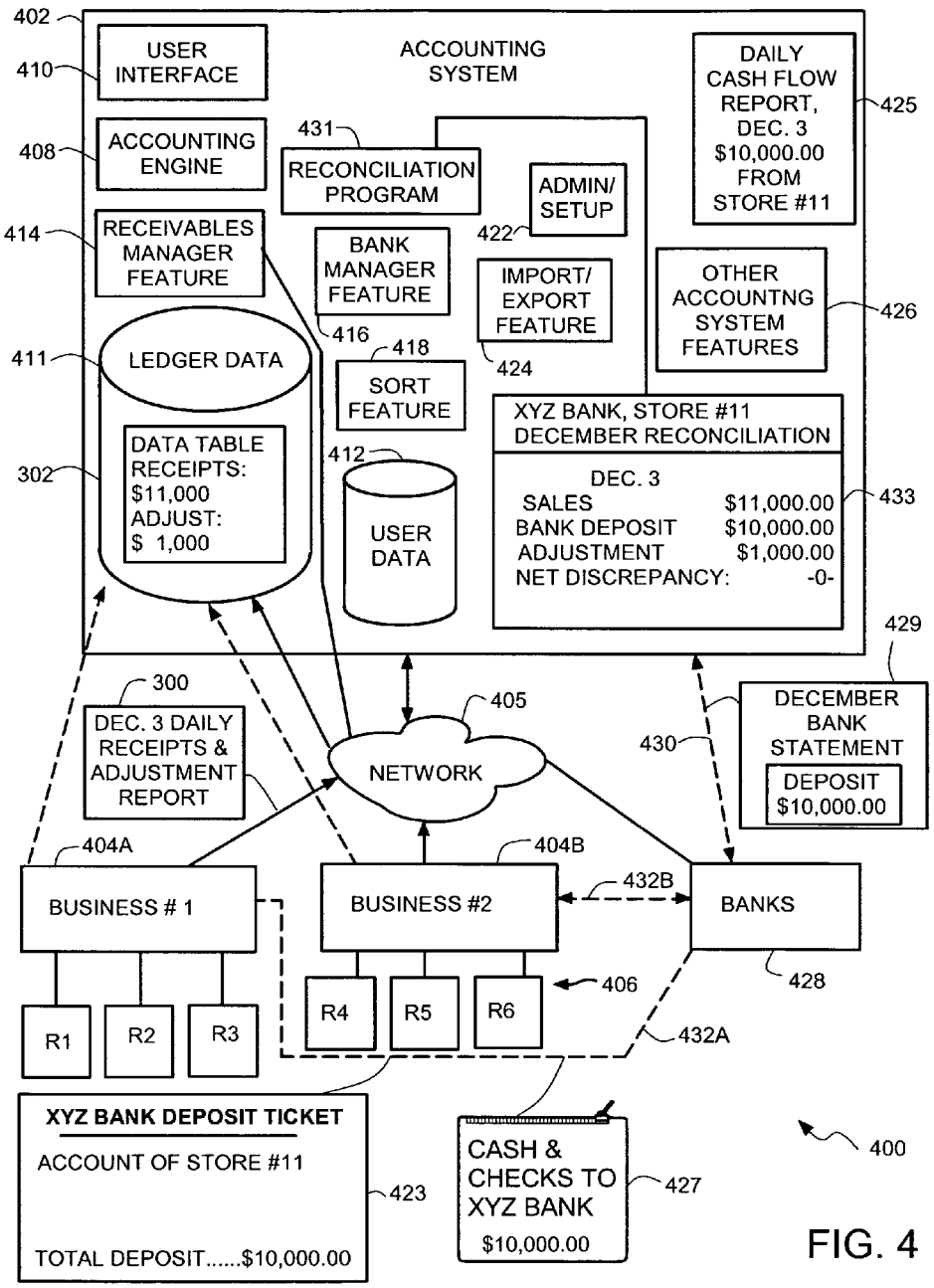
FIG. 4 illustrates a block diagram of a portion of a computing environment including retail stores, banks and a retailer accounting department.

FIG. 4 is a simplified block diagram of an enterprise system 400 according to an embodiment of the present invention. The system 400 includes an accounting system 402, which can be coupled to one or more businesses, such as businesses 404A and 404B, over a network 405 or by direct connections (indicated by phantom arrows). Each of the one or more businesses 404A and 404B can include one or more inputs (such as cash registers, generally indicated by reference numeral 406 and identified by "R1", "R2", "R3", "R4", "R5", and "R6"). In this instance, the registers 406 record receipts (cash, check, debit and credit) transactions, which can be uploaded to the accounting system 402 over network 405.

The accounting system 402 can include an accounting engine 408, a user interface 410, ledger data 411, user data 412, a receivables manager 414, a bank manager feature 416, a sort feature 418, an admin/setup utility 422, an import/export feature 424, and optionally other accounting system feature(s) 426. A user, such as an accountant, can access the data stored in the ledger data 411 by interacting with user interface 410. The user interface 410 can be used to manipulate the data in the ledger data 411 using the accounting engine 408. The user data 412 can include user names, associated password information, and associated access privileges to control access to the accounting system 402. The accounting engine 408 is adapted to control access to the ledger data 411 based on the user data 412. The receivables manager feature 414 can be used by an accountant to access individual transaction lines in the ledger data 411. The bank manager feature 416 can be used by an accountant to access deposit data from a bank 428, over network 405 or by direct connection (indicated by arrow 430). The sort feature 418 can be used to sort receipts into an order based on one or more selectable criteria.

Transactions are recorded to the ledger data 411 over network 405 from each of the registers R1 through R6. Subsequently, each business 404A and 404B (or even a cashier for each register) deposits checks and cash 427 at one or more banks 428 (as indicated by phantom arrows 432A and 432B).

The transaction screen display 200 of FIG. 2 is displayed and used on one of the cash registers 406 or on another computer in the business 404A. The equipment in the business 404A may also include a printer (not illustrated) and the equipment comprises a remote computer environment that is comparable to the remote computer 180 of FIG. 1.

The accounting system 402 is comparable to the computing system environment 100 of FIG. 1. The line of receipts and adjustment data 300 (FIG. 3) is transmitted from the business 404A over the network 405 to the accounting system 402. In the accounting system 402, the line of data 300 is stored in a data table 302. The data table 302 is part of, or accessible by, the accounting engine 408 that is operable in the accounting system 402. The accounting engine 408 generates reports, such as daily cash flow report 425, which are based on receipts data from table 302 that has been corrected in real time by the adjustment data from table 302. The daily cash flow report 425 shows receipts that are corrected by the adjustments. The daily cash flow report 425 has a low level of discrepancies as a result of the adjustments and can be confidently used by the accounting department for making decisions and reporting enterprise financial performance in real time.

In preparation for making a bank deposit 427, the transaction screen display 200 is used as described in connection with FIG. 2, resulting in transmission of data line 300 and optional printing of a deposit ticket 423. The deposit ticket 423 and the deposit 427 are then taken to the bank 428 and the deposit is completed and credited to an account of the retailer.

At periodic intervals, typically monthly, the bank 428 generates a bank statement 429 and transmits the bank statement 429 to the retailer accounting department 402. The bank statement 429 may be in paper form and be scanned or manually keyed in at the accounting department 402. The bank statement 429 may also be in the form of an electronic transmission to the accounting department 402. The bank statement provides a delayed transmission rather than a real time transmission of deposit information. In either case, deposit information is entered into a bank statement reconciliation program 431. The reconciliation program 431 generates and displays a reconciliation report 433. An example of the reconciliation program 431 is described in more detail below in connection with FIG. 5.

Figure 5:
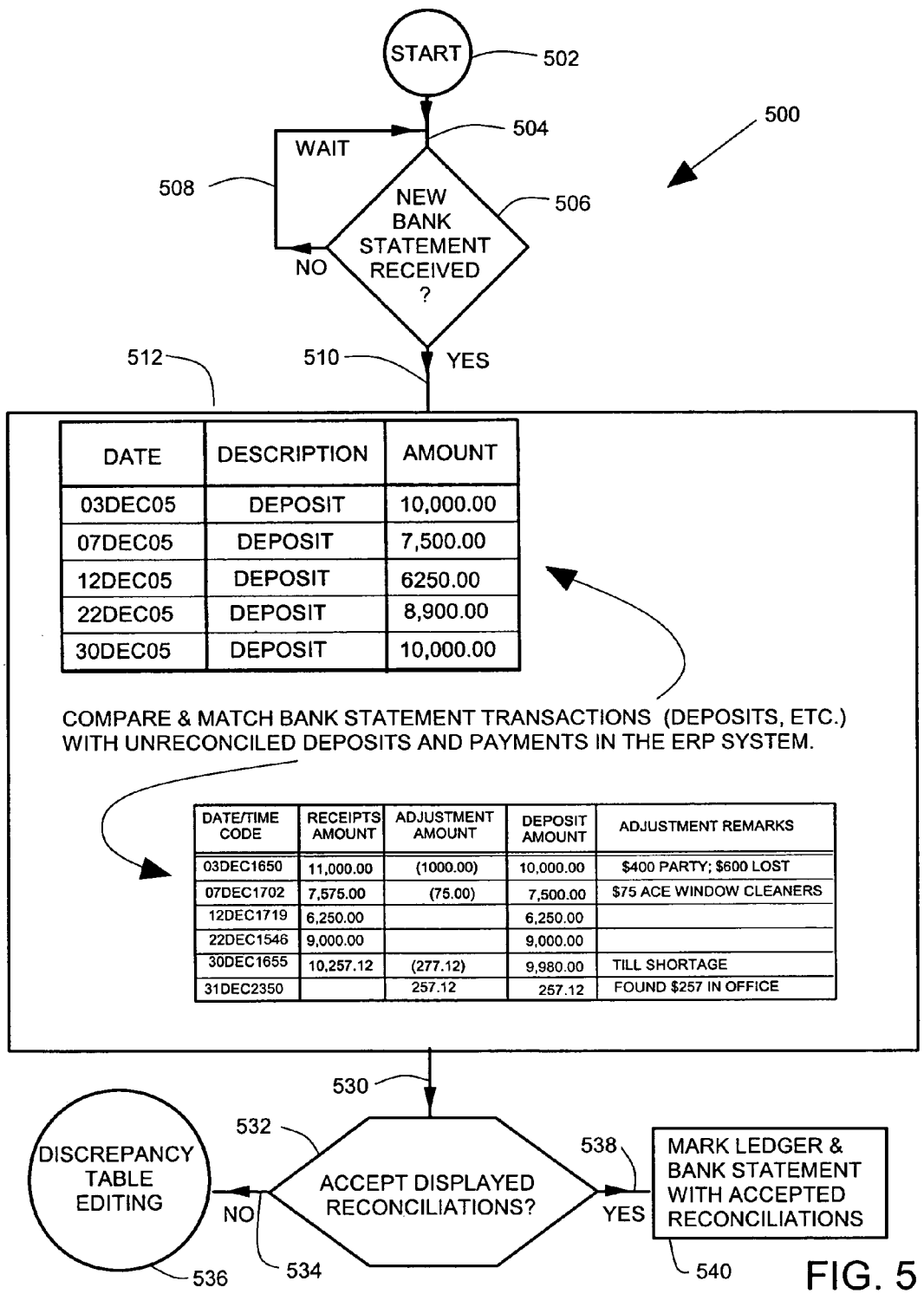
FIG. 5 illustrates an example flow chart of an automatic bank statement reconciliation program in a retailer accounting department.

FIG. 5 illustrates an example flow chart of an automatic bank statement reconciliation program 500 operating in a computing system environment 402 (FIG. 4) in a retailer accounting department. The reconciliation program 500 is typically run after a bank statement for a previous month has been received by the accounting department 402 (FIG. 4).

At start 502, the reconciliation program 500 has access to data from general ledger program 411 (such as a large number lines of data 300 in data table 302 of FIG. 3, and also has access to deposit information from the bank statement 429 (FIG. 4). Program flow continues from start 502 along line 504 to decision block 506. At decision block 506, if a new (unreconciled) bank statement has not been received, then program flow continues along wait loop 508 back to line 504. If a new (unreconciled) bank statement is received at decision block 506, then program flow continues along line 510 to action block 512.

At action block 512, bank statement transactions such as deposits are compared and matched with unreconciled deposit, adjustments, payments, etc. that are in the ERP system. a reconciliation data table 600 (FIG. 6) is created, and data is copied into the reconciliation data table 600 as described in more detail below in connection with FIG. 6. This copied data includes (unreconciled) bank deposit data from the bank statement 429 (FIG. 4), and (unreconciled) lines of receipts and adjustment data 300. In a preferred arrangement, the data copied into the reconciliation data table can be limited by start and end dates, bank, or other scoping parameters. After completion of the data copying, the reconciliation data table 600 typically appears as described below in connection with a simplified example shown in FIG. 6. The sort feature 418 sorts table 600 to produce sorted tables 700, 800, 900 in FIG. 7-9 and then program flow continues from action block 512 along line 530 to decision block 532.

At decision block 532, an operator views the displayed table and can view the displayed reconciliations and accept them, in which case program flow continues along line 538 to action block 540. At action block 540, accepted reconciliations are marked accepted and removed from the reconciliation table. If the operator does not accept the displayed reconciliations, then program flow continues along line 534 to a discrepancy table editing program 536 which allows the operator to make correcting entries to the data table in order to complete reconciliation.

FIG. 6 illustrates an example of a reconciliation data table 600 including bank deposit information and unreconciled deposits from the ERP system. Data lines in the table 600 are in the order in which they have been copied into the table. The data shown in the table is merely exemplary. In some cases, bank statements will include date codes but not time codes for bank deposits, in which case sorting of bank deposits is based only on the date codes, with an arbitrary time code inserted in place of an actual time code.

FIG. 7 illustrates an example of a reconciliation data table 700 after sorting table 600 by date/time code. Data lines in data table 700 are arranged in chronological order. Data in the sorted reconciliation data table 700 is identified by date/time groups. In a first pass, lines of data are assigned a non-zero unique group number if they are one receipts and adjustment line and one bank deposit line in sequence, and the dollar amounts balance to zero, indicating complete agreement of the dollar amounts. In a second pass, remaining lines of data are assigned a unique non-zero group number if they are sequential and dollar amounts balance to within plus or minus 5% of a deposit line in the group. If there are remaining data lines that have not been assigned a unique group number, then in a subsequent pass, fuzzy logic is used to analyze date/time codes, dollar amounts and transaction numbers, and additional unique group numbers may be assigned, or some lines may remain with zero group numbers. The process of sorting into group numbers described above is merely exemplary, and other processes may be used.

FIG. 8 illustrates an example of a reconciliation data table 800 after calculation of date/time groups. Date/time group numbers are assigned as explained above in connection with FIG. 6 to assign a unique date/time group to each set of related data lines. A grouped reconciliation data table 800 (FIG. 8) results. A reconciliation discrepancy calculation is performed for each group in the grouped reconciliation data table. The reconciliation discrepancy is calculated as a currency (e.g., dollar) amount of the ledger deposit plus the ledger discrepancy minus the actual bank deposit. If the reconciliation discrepancy for a group is zero, the group is marked as reconciled as illustrated in FIG. 9. Groups that do not add to zero are left marked not reconciled as illustrated in FIG. 9. The table in FIG. 9 is then displayed and program flow continues along line 530 to decision block 532 (FIG. 5). FIG. 9 illustrates an example of a reconciliation data table 900 after automatic reconciliation. Reconciled groups of data are marked "YES" to indicate reconciliation.

It will be understood by those skilled in the art that display of lines of data in the data table 900 may be only partial, and that an operator may optionally access non-displayed data, for example, by double clicking a mouse on a data element in the table. The adjustment remarks may not be displayed initially, for example, but may be optionally accessed by the operator as needed. The operator can thus "drill down" into data displayed to obtain more details such as names of persons making reports, names of persons making deposits and other data entered using the screen of FIG. 2.

Although the present invention has been described with reference to particular embodiments, workers skilled in the art will recognize that changes may be made in form and detail without departing from the spirit and scope of the invention.

What is claimed is:

1. A method of correcting a computerized ledger of a business for deposit discrepancies that comprise cash shortages or cash overages, comprising:

displaying a transaction screen display associated with a current deposit transaction for the business;

automatically receiving, at the computerized ledger, data representing an amount of receipts recorded at one or more cash registers at the business, since a time of entry of a most recent transaction deposit report and associated with the current deposit transaction and displaying the amount of receipts on the transaction screen display;

receiving, from a user data representing an amount of adjustment between the amount of receipts recorded at the one or more cash registers and an amount to be deposited at a bank for the business as the cash overages or cash shortages; wherein the user enters the amount of adjustment using a point-of-sale terminal keypad as a user interface selection device in a retail computing environment at the business; and storing the amount of receipts adjusted by the amount of adjustment in an accounting department computing environment that is remote from the retail computing environment;

storing the data representing the amount of receipts and the data representing an amount deposited in the computerized ledger; and providing a real time current transaction report output from the computerized ledger that represents the amount of receipts adjusted by the amount of cash adjustment;

wherein the amount of receipts for the one or more cash registers in the current cash transaction report output is automatically obtained from a computer system in the business and is not alterable by the user making the current deposit transaction.

2. The method of claim 1 further comprising:
   receiving a user input from the user at the business, through the transaction screen display, the data representing the amount of adjustment as a cash under amount.

3. The method of claim 1 further comprising
   receiving a user input from the user at the business, through the transaction screen display, the data representing the amount of adjustment as a cash over amount.

4. The method of claim 1 further comprising:
   receiving a user input from the user at the business, through the transaction screen display, the data representing the amount of adjustment as a deposit amount; and
   calculating the amount of adjustment as a difference between the deposit amount at the bank and the amount of receipts at the one or more cash registers at the business.

5. The method of claim 1 further comprising:
   displaying the transaction screen display as a window that displays a combination of data stored in a retailer computing environment at the business and data entered by the user.

6. The method of claim 5 further comprising:
   retrieving the data representing the amount of receipts from the retailer computing environment.

7. A computer-readable storage medium having computer executable instructions for performing the steps recited in claim 1.

8. A computer-readable storage medium having stored thereon a data structure and computer executable instructions, comprising:

a first data field containing data representing an amount of receipts at a cash register at a business since a time of entry of a most recent transaction deposit report associated with a current deposit transaction for the cash register at the business;

a second data field containing data input by a user at the business representing an amount of adjustment between the amount of receipts at the cash register and an amount of deposit associated with the current deposit transaction, as an amount of cash overage or an amount of cash shortage, wherein the user enters the amount of adjustment using a point-of-sale terminal keypad as a user interface selection device at the business; and storing the amount of receipts adjusted by the amount of adjustment in an accounting department computing environment that is remote from the retail computing environment; and identifying information that uniquely identifies the data structure to distinguish the data structure from other data structures for other deposit transactions, wherein the amount of receipts in the current deposit transaction is automatically obtained from a computing environment in an the business and is not alterable by a person user making the current deposit transaction; and wherein, when a computer processor accesses the computer executable instructions, the computer processor generates a user interface display that automatically displays the amount of receipts and a user input portion that receives a user input indicative of the amount of adjustment.

9. The computer-readable storage medium of claim 8, wherein the identifying information comprises an automatically assigned transaction number.

10. The computer-readable storage medium of claim 8 wherein the identifying information comprises a date/time code that corresponds with at least a date code on a corresponding deposit report in a bank statement.

11. The computer-readable storage medium of claim 8 wherein the data representing an amount of adjustment comprises a cash under amount.

12. The computer-readable storage medium of claim 8 wherein the data representing an amount of adjustment comprises a cash over amount.

13. The computer-readable storage medium of claim 8 wherein the data representing an amount of adjustment comprises a net deposit amount, and an adjustment amount is calculated from the deposit amount and the net deposit amount and the amount of receipts.

14. In a computer system having a graphical user interface including a display and a user interface selection device, a method of correcting a computerized ledger for deposit discrepancies, comprising:

displaying a transaction window associated with a deposit transaction;

receiving, and displaying through the transaction window, data representing an amount of receipts at one or more cash registers for a business since a time of entry of a most recent transaction deposit report for the business and associated with the current deposit transaction from the computer system;

receiving data representing an amount of adjustment, from a user at the business through the transaction window, the amount of adjustment being a difference between the amount of receipts and an amount deposited in the current deposit transaction from the user interface selection device; wherein the user enters the amount of adjustment using a point-of-sale terminal keypad as a user interface selection device at the business; and storing the amount of receipts adjusted by the amount of adjustment in an accounting department computing environment that is remote from the retail computing environment;

storing the data representing the amount of receipts and the data representing an amount deposited in a computerized ledger; and providing a real time current transaction report output from the computer system for the business that represents the amount of receipts adjusted by the amount of adjustment, as indicative of an amount of cash overage or cash shortage;

wherein the amount of receipts in the current transaction report is automatically obtained from a computing environment in the business and is not alterable by a person making the current deposit transaction.

15. The method of claim 14 further comprising:

receiving the data representing the amount deposited as a cash under amount.

16. The method of claim 14 further comprising:

receiving the data representing the amount deposited as a cash over amount.

17. The method of claim 14 further comprising:

calculating a fee representing a cash under amount as a difference between the amount deposited and the receipts amount.

18. The method of claim 14 further comprising:

providing the real time output in the form of a daily cash flow report.

* * * * *